4223

W.E. CRANDALL.
Childrens Carriage. & ROCKING HORSES.

REISSUED JAN. 3 1871

Witnesses
J. C. Sutton
O. A. Winckel

Inventor:
Wm. E. Crandall
by Wiedersheim & Norris
his Attys.

W. E. Crandall.

CHILDRENS CARRIAGE and ROCKING HORSES.

REISSUED JAN 3 1871

Witnesses.
F. J. Peyton
W. H. Hinckel

Inventor.
Wm. E. Crandall
by Niedersheimer & Norris
Attys

United States Patent Office.

WILLIAM E. CRANDALL, OF NEW YORK, N.Y.

Letters Patent No. 100,121, dated February 22, 1870; reissue No. 3,972, dated May 17, 1870; reissue No. 4,223, dated January 3, 1871.

IMPROVEMENT IN CHILDREN'S CARRIAGES.

The Schedule referred to in these Letters Patent and making part of the same.

*To all whom it may concern:*

Be it known that I, WILLIAM E. CRANDALL, of the city, county, and State of New York, have invented a new and useful Improvement in Children's Carriages and Rocking-Horses; and I do hereby declare the following to be a clear and exact description thereof, sufficient to enable others skilled in the art to which my invention appertains to fully understand and use the same, reference being had to the accompanying drawings making part of this specification, in which—

Similar letters of reference indicate corresponding parts in the several figures.

Figure 1:
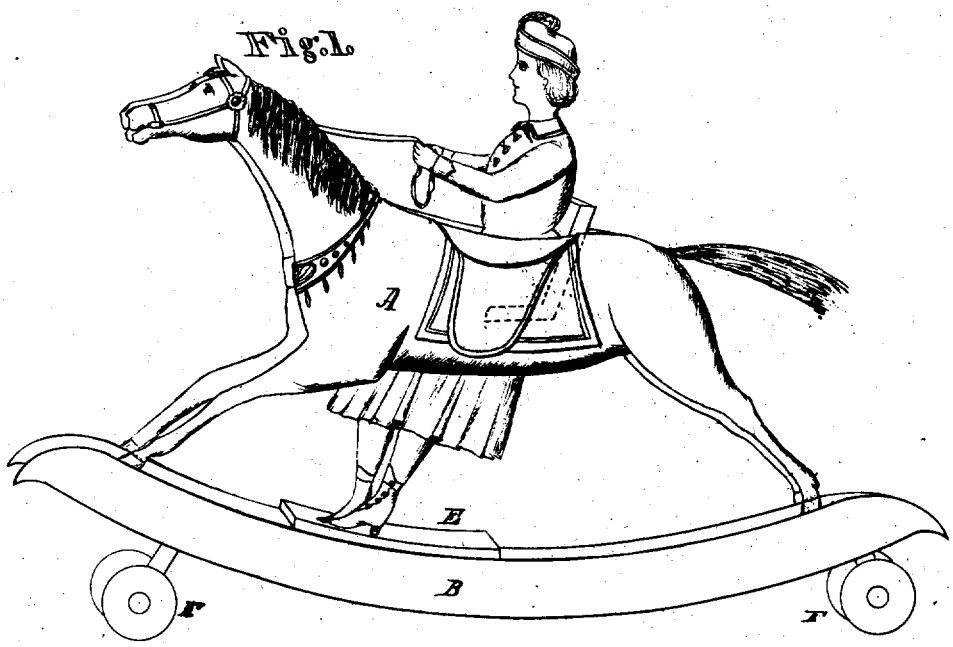
Figure 1 is a side view of the device illustrating my invention.
Figure 2:
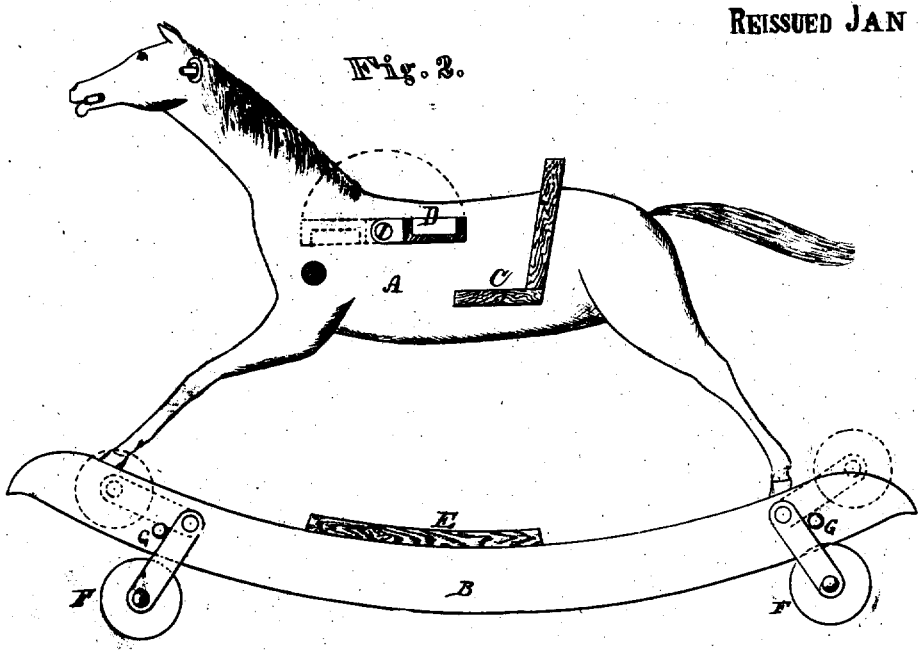
Figure 2 is a central vertical longitudinal section thereof.
Figure 3:
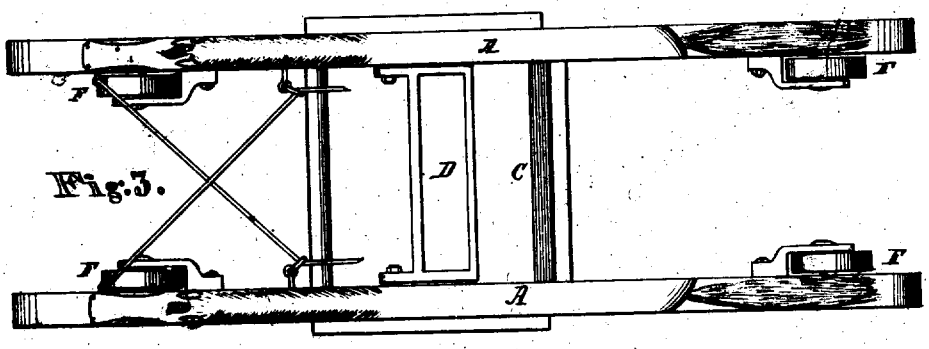
Figure 3 is a top or plan view.

My invention consists in constructing the body of a child's carriage of two frames, representing horses in profile, each mounted on a rocker, and connected together by a seat and a foot-board;

Also of a toy-box arranged between the profile frames;

And furthermore it consists of a combination of parts, as will hereinafter more fully be set forth.

The body may be mounted on wheels or rockers, and thus form a carriage or rocking-horse, at the pleasure of the child.

In the drawings—

A A are two frames representing horses in profile, which are arranged parallel to each other, with their feet resting on a base, B, which if desired may be in the form of rockers of an ordinary rocking-horse.

The profile-frames are connected together by cross-pieces forming a seat, C.

A box, D, is hinged in front of the seat, serving to hold the child in place and forming a receptacle for playthings, and which can be turned over to let the child out.

The base B and the frames, respectively, may be connected together by auxiliary cross-rods, bars, or braces, or otherwise, for strengthening purposes; and the child may rest his feet on a foot-board, E, which is secured to the base B.

To the base B there is connected, in any suitable manner, a series of wheels, F, whose bearings should be so constructed that the wheels may be swung or raised up or down, whereby the whole weight may rest either on the wheels or on the rockers or bed.

When it is desired to employ the device as a carriage, the wheels are swung or moved downward; and by means of suitable pins, G, or other retaining devices, the rockers are cleared from the floor and the carriage can then be used as an ordinary child's carriage.

When the wheels are raised or removed, then the bed should consist of rockers, so that the child can rock itself after the manner of a rocking-horse.

Should the arms or shafts of the wheels be immovable fixtures, the bed may consist of a flat board or strip, and not be in the form of rockers.

The frames A A, representing horses in profile, and their connecting seat, form an attractive and amusing riding mechanism, and present the appearance of two animals, which the child can imaginarily drive simultaneously without straddling, and thus without danger of falling out.

Suitable harness may be placed on the horses, and the bridle extend within convenient reach of the child.

Having thus described my invention,

What I claim as new, and desire to secure by Letters Patent, is—

1. A riding device, consisting of the profile frames A A connected together by a seat so as to allow the feet of the rider to extend downwardly between the said frames, substantially as described.

2. Two profile frames terminating in rockers below, and connected together by a seat and a foot-board.

3. The combination of a box, D, profile-frames A A, and a suitable seat, C, substantially as described.

4. The profile-frames A A, seat C, box D, bed B, rockers and wheels, combined and operating in relation to each other, substantially as described.

5. A hinged toy-box arranged between two profile-frames, substantially as described.

6. The wheels F, arranged upon the rockers in front and rear, in combination with the two profile frames connected together by a seat, substantially as described.

7. A riding device produced substantially as described, that is to say, that it can be converted into a carriage or rocking-horse through the medium of rockers and wheels, the latter adapted to be raised or lowered, substantially as described.

To the above specification I have signed my name this 8th day of December, A. D. 1870.

W. E. CRANDALL.

Witnesses:

J. VAN SANTVOORD,

W. HAUFF.